United States Patent
Garg et al.

(10) Patent No.: US 9,486,074 B2
(45) Date of Patent: Nov. 8, 2016

(54) ENCLOSURE FOR BIOMETRIC SENSOR

(71) Applicant: TATA CONSULTANCY SERVICES LIMITED, Maharashtra (IN)

(72) Inventors: Shalin Garg, Karnataka (IN); Vibhor Goswami, Karnataka (IN); Sathish Vallat, Karnataka (IN); Natarajan Ganapathy Subramaniam, Karnataka (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 447 days.

(21) Appl. No.: 13/727,451

(22) Filed: Dec. 26, 2012

(65) Prior Publication Data
US 2014/0077673 A1    Mar. 20, 2014

(30) Foreign Application Priority Data

Sep. 17, 2012  (IN) .......................... 2714/MUM/2012

(51) Int. Cl.
G06K 9/00       (2006.01)
A47B 81/00      (2006.01)

(52) U.S. Cl.
CPC .......... *A47B 81/00* (2013.01); *G06K 9/00033* (2013.01); *G06K 9/00053* (2013.01); *G06K 2009/00932* (2013.01)

(58) Field of Classification Search
None
See application file for complete search history.

(56) References Cited

U.S. PATENT DOCUMENTS

| | | | | |
|---|---|---|---|---|
| 4,868,672 A * | 9/1989 | Hiroki | .................. | H04N 1/0057 358/474 |
| 5,084,732 A * | 1/1992 | Tsaur | .................. | G03G 15/234 355/25 |
| 5,203,329 A * | 4/1993 | Takatani | ............ | A61B 5/14552 356/41 |
| 6,026,258 A * | 2/2000 | Fresk | .................. | G03G 15/221 358/296 |
| 6,404,904 B1 * | 6/2002 | Einighammer et al. | ...... | 382/124 |
| 7,917,769 B2 * | 3/2011 | Campisi | ........................ | 713/186 |
| 8,174,738 B2 * | 5/2012 | Ono | ......................... | H04N 1/03 250/208.1 |
| 2002/0031245 A1 * | 3/2002 | Rozenberg et al. | .......... | 382/125 |
| 2006/0120573 A1 * | 6/2006 | Iori | ............................... | 382/124 |
| 2008/0025582 A1 * | 1/2008 | Kobayashi | .................... | 382/124 |
| 2009/0041309 A1 * | 2/2009 | Kim et al. | .................... | 382/117 |
| 2009/0281399 A1 * | 11/2009 | Keel | .................. | A61B 5/02158 600/301 |
| 2010/0085151 A1 * | 4/2010 | Hama et al. | .................. | 340/5.82 |
| 2012/0258773 A1 * | 10/2012 | Alvarez Rivera et al. | .......................... | 455/556.1 |
| 2013/0066172 A1 * | 3/2013 | Kulcke | .............. | A61B 5/14532 600/310 |
| 2013/0289372 A1 * | 10/2013 | Imran | .................. | A61B 5/1459 600/339 |

FOREIGN PATENT DOCUMENTS

JP        410079837    *  3/1998

OTHER PUBLICATIONS

Fujitsu PalmSecure Sensor Holder Unit, Delany Secure Ltd, retrieved from www.delaneysecure.com on Jul. 13, 2012, 1 page.

* cited by examiner

*Primary Examiner* — Robert R Raevis
(74) *Attorney, Agent, or Firm* — Lee & Hayes, PLLC

(57) ABSTRACT

An enclosure for a biometric sensor is described. The enclosure comprises a cabinet having a plurality of surfaces. The biometric sensor placed inside the cabinet on a holder fixed on a primary surface from amongst the plurality of the surfaces. A secondary surface from amongst the plurality of surfaces is opposite to the primary surface. The secondary surface is substantially transparent to electromagnetic rays emitted by the biometric sensor.

13 Claims, 5 Drawing Sheets

ENCLOSURE FOR BIOMETRIC SENSOR

TECHNICAL FIELD

The present subject matter relates, in general, to an enclosure for a biometric sensor and, particularly but not exclusively, to an enclosure for a palm sensor.

BACKGROUND

A biometric sensor identifies a user by his physiological or behavioral characteristics, such as palm print, finger print, iris, and voice. Such characteristics are also referred to as biometric characteristics. After identification of the user, the biometric sensor authorizes the user to perform any requested action. For example, a palm print sensor may allow the user to enter restricted areas after authentication of physiological or behavioral characteristics of the user's palm. Biometric sensors are generally installed at various locations for ensuring security and access control management, such as in organizations for keeping track of employee's attendance and ensuring security of systems and networks, in personal devices for tracking proper usage, and in electronic commerce to prevent online frauds.

The biometric sensors are generally placed in a holder that supports the sensor. The holder may indicate a proper position to the user from where the biometric sensor can easily detect the biometric characteristics. For example, the holder may allow the user to place his palm in a field of view of the biometric sensor, so that the biometric sensor can easily capture an impression or an image of the palm.

SUMMARY

This summary is provided to introduce concepts related to an enclosure for a biometric sensor and these concepts are further described below in the detailed description. This summary is not intended to identify essential features of the claimed subject matter nor is it intended for use in determining or limiting the scope of the claimed subject matter.

In one embodiment of the present subject matter, an enclosure for a biometric sensor is described. The enclosure comprises a cabinet having a plurality of surfaces. The biometric sensor is placed inside the cabinet on a holder fixed on a primary surface from amongst the plurality of the surfaces. A secondary surface from amongst the plurality of surfaces is opposite to the primary surface. The secondary surface is substantially transparent to the electromagnetic rays emitted by the biometric sensor.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the figures to reference like features and components. Some embodiments of the method(s) in accordance with the present subject matter are described, by way of example only, and with reference to the accompanying figures, in which.

Figure 1A:
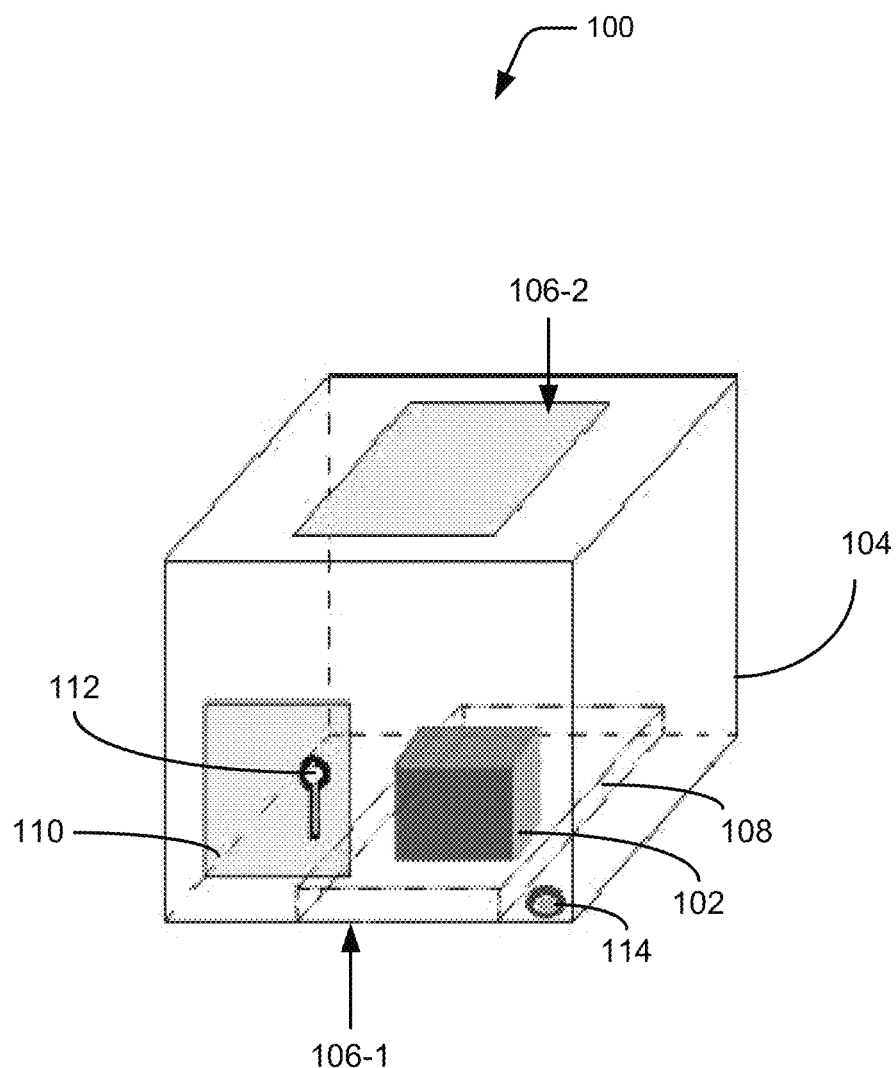
FIG. 1(a) illustrates a perspective view of an enclosure of a biometric sensor, in accordance with an embodiment of the present subject matter.

It should be appreciated by those skilled in the art that any block diagrams herein represent conceptual views of illustrative enclosures embodying the principles of the present subject matter.

DETAILED DESCRIPTION

The present subject matter relates to an enclosure for a biometric sensor. The enclosure of the present subject matter conceals the biometric sensor to secure the biometric sensor from tampering, wear and tear, theft, and other factors, such as dust, moisture, and liquid spills.

The biometric sensor may be a palm sensor, a finger print sensor, an iris sensor, a footprint sensor, a hand/feet geometry sensor, an ear lobe geometry sensor, a face biometric sensor, or any other biometric sensor which is used to authenticate a user based on his biometric characteristics. Most of the biometric sensors emit electromagnetic waves, specifically infrared (IR) rays, to obtain biometric characteristics of the user and have a suitable capture device, specifically an IR camera, to capture reflected rays that are indicative of the biometric characteristics of the user. For example, a palm vein sensor emits IR rays to obtain vein data of a palm. The IR rays fall on the palm, illuminating the blood vessels (veins), and are reflected back to the palm vein sensor. The reflected IR rays are in accordance with the impression of the palm and the veins. The reflected image of the palm and the veins, made by the IR rays, is captured by the IR camera inside the palm vein sensor. Thereupon, the palm vein sensor may send the vein image data, captured in the reflected IR rays of the palm to a system for authentication. The system for authentication, as conventionally known, compares the vein data of a registered user with pre-stored registration data of the registered user to authenticate the registered user.

In one typical implementation, the biometric sensor may emit near IR rays to capture the biometric characteristic of the user because of low attenuation characteristic of the near IR rays. For correct authentication of the user, it is important that there should be no hindrance in path of the near IR rays between the biometric sensor and the user. For this, most of the biometric sensors are kept exposed to the users or require direct contact with the user for accurate identification. Because of this exposure, there are always chances of tampering, vandalism, and theft. Also, the biometric sensors are exposed to factors, such as dust, moisture, and liquid spills. Further, the exposed biometric sensors are more prone to wear and tear due to exposure to external conditions over long duration of time. Therefore, regular maintenance and protection of the biometric sensors may be required to protect the biometric sensors from various abovementioned factors. Generally, the biometric sensors are located at manned and unmanned locations. At unmanned locations, it may not be possible to provide regular maintenance to the biometric sensors. Further, the biometric sensors at unmanned locations are more prone to theft, tampering, and vandalism.

Further for correct authentication, the user's biometric characteristic should be in the field of view of the IR camera of the biometric sensor and there should be an optimum distance between the biometric sensor and the biometric characteristic such that the biometric characteristic is within the focus of the biometric sensor and the biometric characteristic is captured accurately. Therefore, a holder or an enclosure is needed, which not only protects the biometric sensor from the abovementioned threats but also allows the biometric sensor to accurately capture the biometric characteristic of the user without any hindrance to the IR rays in its field of view.

In one conventional approach, the biometric sensor is placed in a sensor holder. The sensor holder holds the biometric sensor and allows the biometric sensor to capture biometric characteristics without any direct contact with the user. The top surface of the sensor holder is kept open to avoid hindrance from path of the IR rays. In another conventional approach, the biometric sensor is placed in the sensor holder with placement marks or guides. The placement marks indicate a placement area at an optimum distance from where the biometric sensor can accurately capture the biometric characteristic of the user. The placement marks are made on edges of the sensor holder. In this sensor holder also, the top surface is kept open to avoid any kind of hindrance to the IR rays.

Thus, conventional sensor holders are unable to provide protection to the biometric sensors from tampering, wear and tear, theft, moisture, dust, and liquid spills. Also, regular maintenance of the biometric sensors is required, which may not be possible at unmanned locations.

In another conventional approach, to protect the biometric sensor, a glass enclosure may be used to conceal the biometric sensor. Use of the glass enclosure may help in avoiding situations where regular maintenance of the biometric sensor is required, but accuracy of the biometric sensor may get affected. This happens because glass is reflective in nature and amount of reflected rays depends on the angle of incidence, which makes a large part of the electromagnetic rays to reflect back rather than propagating through the glass. Due to this tendency of the glass, reflection of the biometric sensor is created when it tries to capture the impression of the user's biometric characteristic. The reflection of the electromagnetic rays from the glass, generated by the biometric sensor's emitters (Infrared Light Emitting Diodes or IR LEDs), generally appears as big bright round objects, similar to light bulbs, in the image captured by the biometric sensor's camera. These reflections may interfere with an image having impression of the user's biometric characteristic. Therefore in the case of glass enclosure, the biometric characteristic is not captured accurately, which in turn deteriorates the accuracy of the biometric sensor placed in the glass enclosure. Conventional approaches to protect the biometric sensors using casings made of transparent materials, such as glass and acrylic have typically resulted in high false rejection and false acceptance rates, that consequently makes the biometric sensor, and in turn the authentication system, ineffective. In many cases, the authentication system rejects the image taken by the sensor.

The present subject matter discloses an enclosure for a biometric sensor. The enclosure conceals the biometric sensor from a user and secures the biometric sensor from tampering, wear and tear, theft, moisture, dust, and liquid spills without affecting accuracy of the biometric sensor. The biometric sensor may emit electromagnetic rays to capture biometric characteristic of the user. In one implementation, the biometric sensor is a palm vein sensor, for example, Fujitsu PalmSecure™ Palm vein sensor may be concealed in the enclosure.

In an implementation, the enclosure comprises a cabinet to hold the biometric sensor. The biometric sensor may be a palm print sensor, a palm vein sensor, or a finger print sensor. The cabinet is designed to conceal the biometric sensor from the user and various factors, such as dust, moisture, and liquid spills and to restrict any unwanted illuminations around the biometric sensor. The cabinet may be made up of material depending upon the requirements of the user. For example, the cabinet may be a wooden cabinet to conceal the biometric sensor.

The cabinet includes a plurality of surfaces which forms an enclosure to conceal the biometric sensor from the environmental factors and users. The biometric sensor may be placed on a holder, provided on a primary surface of the cabinet. The primary surface is one amongst the plurality of surfaces. The holder on the primary surface firmly holds the biometric sensor to provide stability to the biometric sensor in the cabinet. The holder may be designed to hold different types of sensors in the cabinet. For example, the holder may be designed in a cube shape to hold the palm vein sensor in the cabinet.

A secondary surface, amongst the plurality of surfaces, is substantially transparent to electromagnetic rays emitted by the biometric sensor for authenticating a user based on his biometric characteristic. In one implementation, the biometric sensor may emit electromagnetic rays to capture the biometric characteristic of the user. The secondary surface may be kept opposite to the primary surface such that the electromagnetic rays emitted from the biometric sensors captures the biometric characteristic and reflect back to an electromagnetic ray capturing device of the biometric sensor. The secondary surface allows the electromagnetic rays emitted from the biometric sensor to pass through it. For example, a clear glass, an etched glass, a partially etched glass, a clear glass with etching done in a unique pattern, a butter paper, a tracing paper, a translucent paper, a translucent plastic sheet, and an acrylic sheet may be used as the secondary surface. In one implementation, a single-side etched glass is used as the secondary surface in such a manner that the etched surface of the glass faces the biometric sensor. The secondary surface may be kept in a field of view of the biometric sensor at a predefined distance. The predefined distance may vary, depending upon the type of biometric sensor used. In another implementation, secondary surface is placed behind a hardened glass sheet to increase the strength of the enclosure, which may help in preventing theft and tampering of the biometric device.

In one implementation, the secondary surface which allows the electromagnetic rays to pass through may be kept at a predefined angle from the top surface of the biometric sensor. The top surface of the biometric sensor may be defined as a surface from where the biometric sensor is emitting the electromagnetic rays.

In another implementation, the biometric sensor may be placed on the holder such that the secondary surface of the enclosure and the top surface of the biometric sensor may have a predefined angle between them. This type of placement of the secondary surface with respect to the biometric sensor may help in preventing the reflected, from the secondary surface, electromagnetic rays from falling onto the capture device of the biometric sensor. This improves the accuracy of the biometric sensor concealed in the enclosure because now the image of the emitters is not visible in the captured biometric characteristic's image. It may be evident to a person skilled in the art that the various other placements of the secondary surface and the biometric sensor are also possible and may be implemented without deviating from the scope of the invention.

In one implementation, the secondary surface may have a curved shape which may help in focusing the beam of the electromagnetic rays emitted from the biometric sensor to the camera of the biometric sensor. For example, the secondary surface may have concave shape so that maximum electromagnetic rays having the biometric characteristic of the user fall onto the camera of the biometric sensor and the image of the emitters is out of the field of view of the biometric sensor.

The plurality of surfaces other than the secondary surface may be coated to absorb unwanted illuminations around the biometric sensors. The unwanted illuminations may deteriorate accuracy of the biometric sensor by interfering with the rays. The unwanted illuminations may arise from external sources near to the enclosure. The unwanted illuminations from the external source may enter the cabinet and interfere with the electromagnetic rays which deteriorate the accuracy of the biometric sensor. In one example, the plurality of surfaces other than the secondary surface may be coated with matte finish black colour paint to absorb the unwanted illuminations in the cabinet. The coating may also help in absorbing unwanted rays originating from the biometric sensor. In absence of the coating, these unwanted rays may interfere with the electromagnetic rays by reflecting back from the other surfaces of the enclosure when biometric identification is being performed.

In one implementation, a tertiary surface substantially transparent to the electromagnetic rays may be overlaid on either side of the secondary surface to improve overall strength, scratch resistance, reflectance, fingerprint or grease mark resistance, and disinfection of the secondary surface. In an example, the tertiary surface may be a thin film overlaid on the secondary surface. In one embodiment, the thin film may be overlaid or coated on either side of the secondary surface. Similarly, in another embodiment, the thin film may be overlaid or coated on both sides of the secondary surface.

The cabinet may be provided with a door having a locking mechanism for safely placing and removing the biometric sensor. The locking mechanism in the door may be used to lock the enclosure after placing the biometric sensor in the enclosure. This may help in securing the biometric sensor from tampering and theft. In one implementation, the cabinet is also provided with a vent or an outlet to allow passage of wires, of the biometric sensor, through, to connect with a computer system for authentication of the user and to perform actions requested by an authenticated user. As mentioned above, the system may be defined as a host system which has pre-stored biometric characteristics of the users and an authentication mechanism to authenticate the users. The authenticated user may be defined as a user whose biometric characteristic matches with the pre-stored biometric characteristics in the system.

In one implementation, the secondary surface may be attached to a proximity sensor to activate the biometric sensor. With the help of the proximity sensor, the biometric sensor may be activated when the biometric characteristic of the user is detected by the proximity sensor near to or on the secondary surface. The proximity sensor helps in avoiding unnecessary or early activation of the biometric sensor. This in turn also helps in reducing the power consumption of the biometric sensor. The biometric sensor may be activated when an authentication of a user is required and only after the user has placed the biometric characteristic correctly over or near the secondary surface. In another implementation, a touch switch or an IR sensor may be used in place of the proximity sensor to detect the presence of biometric characteristic of the user on or near the medium. Some biometric sensors may start the authentication of the user without identifying that whether the biometric characteristic of the user is present on the secondary surface or not. This may generate an error message. The proximity sensor overcomes this problem and the biometric sensor may be activated when the biometric characteristic is placed on the secondary surface correctly.

These and other advantages of the present subject matter would be described in a greater detail in conjunction with the following figures. It should be noted that the description and figures merely illustrate the principles of the present subject matter.

The specification provided here explains in a detailed manner the enclosure for the biometric sensor to secure the biometric sensor from tampering, wear and tear, theft and factors such as, dust, moisture, and liquid spills. For the ease of understanding, the enclosure has been explained herein in context of the palm vein sensor. However, it will be appreciated by one skilled in the art, that although the enclosure has been described with respect to the palm vein sensor, the concept explained in context thereto may be extended to any other biometric sensor and enclosure with different designs, without deviating from the scope and spirit of the invention. For example, the enclosure may be designed in a cylindrical shape, with a top curved surface and a bottom curved surface, to secure a fingerprint sensor or a hand or earlobe geometry sensor.

Although embodiments for the enclosure for the biometric sensor have been described in the language specific to structural features, it is to be understood that the invention is not necessarily limited to the specific features described. Rather, the specific features are disclosed and explained in the context of a few embodiments of the enclosure.

FIG. 1(a) illustrates a perspective view of an enclosure 100 of a biometric sensor 102, in accordance with an embodiment of the present subject matter. In accordance with the embodiment illustrated in FIG. 1(a), the enclosure 100 houses the biometric sensor 102. The enclosure 100 may be used to conceal various types of biometric sensors, for example, a palm sensor, a finger print sensor, an iris sensor, a footprint sensor, a hand/feet geometry sensor, an ear lobe geometry sensor, and a face biometric sensor.

The biometric sensor 102 may have an electromagnetic ray transmitter (not shown in Figure) and a camera (not shown in Figure). The electromagnetic ray transmitter emits electromagnetic rays that are projected towards the biometric source, for example, a palm of a user to obtain biometric characteristic of the user. In one implementation, the biometric sensor 102 emits near IR rays because of their low attenuation characteristic. The electromagnetic rays are reflected from the biometric source back to the biometric sensor 102. The reflected electromagnetic rays comprise the biometric characteristic. The reflected electromagnetic rays are captured by the camera for authentication. The construction and operation of the biometric sensor 102 is conventionally known and thus is not elaborated herein in details for the sake of brevity of the present description.

In accordance with one embodiment of the present subject matter, the enclosure 100 may be used to conceal and secure a palm vein sensor. The palm vein sensor emits near IR rays which when reflected from the palm of a user is indicative of vein data of the palm of the user. Accordingly, these near IR rays are projected on the palm and for obtaining the vein data in this case. An IR camera of the palm vein sensor captures the reflected near IR rays. For capturing the IR rays accurately, there should be no hindrance in the path of the near IR rays. Intensity of the IR rays of the biometric sensor 102 may, in one example, be set below a threshold value set by American Conference of Industrial Hygienists (ACGIH). For example, IR rays of intensity of about 10 mW/cm$^2$ (milliwatt per centimeter square) may be used to capture the biometric characteristic.

In one implementation, the enclosure 100 comprises a cabinet 104. The cabinet 104 is designed in such a way that it conceals the biometric sensor 102 from the users and other external factors. The cabinet 104 may be made up of different materials depending upon the requirements. For example, the cabinet 104 may be made up of an alloy which has high strength and light weight. In another example, a wooden cabinet may be used to conceal the biometric sensor 102. The cabinet 104 may be designed depending upon the biometric sensor 102 to be placed. For example, the cabinet 104 may have a cubical shape to enclose the palm vein sensor. The dimensions of the cabinet 104 may be in accordance with the size of the biometric sensor 102 and may vary based on the requirement.

In one implementation, the cabinet 104 includes a plurality of surfaces which forms a housing to conceal the biometric sensor 102 from all sides. As shown in the FIG. 1(a), the plurality of surfaces includes a primary surface 106-1, a secondary surface 106-2, and other surfaces. The plurality of surfaces is hereinafter collectively referred to as the plurality of surfaces 106. The primary surface 106-1 and the secondary surface 106-2, from among the plurality of surfaces 106, are opposite to each other. In one implementation, the primary surface 106-1 and the secondary surface 106-2 are parallel to each other. In another implementation, the primary surface 106-1 and the secondary surface 106-2 may be adjacent to each other such that the biometric sensor 102 gets placed appropriately, as per its specifications, under the secondary surface 106-2, such that the biometric sensor 102 can capture the biometric characteristic properly.

The biometric sensor 102 may be placed on a holder 108 fixed on the primary surface 106-1. The holder 108 may be designed based on type of the biometric sensor 102 to be placed in the cabinet 104. For example, the holder 108 may be designed in a rectangular shape to hold the palm vein sensor. The holder 108 firmly grips the biometric sensor 102 to fix the biometric sensor 102 in the cabinet 104. In one implementation, the holder 108 may be placed in the center of the primary surface 106-1 and dimension of the holder 108 may be in accordance with dimension of the biometric sensor 102.

Further, the secondary surface 106-2 from amongst the plurality of surfaces 106 is substantially transparent to the rays. For example, a clear glass, an etched glass, a butter paper, a tracing paper, a translucent paper, a translucent plastic sheet, and an acrylic sheet may be used as the secondary surface 106-2. In an example, other materials which allow the electromagnetic rays to pass through may also be used.

In one implementation, the secondary surface 106-2 may be placed below a hardened glass sheet. The hardened glass sheet increases the strength of the secondary surface 106-2 in the enclosure 100 by providing additional support to the secondary surface 106-2, which protects the biometric sensor 102 from tampering, vandalism, and theft. The hardened glass sheet should not have any visible impurities, additives, aberrations, and bubbles in it. The impurities, additives, aberrations, and bubbles, if any, in the hardened glass sheet, may deviate the electromagnetic rays coming from the biometric sensor 102 or the rays reflecting back from the biometric characteristic, in different directions and in turn may create distortions in an image taken by the biometric sensor 102, affecting the accuracy. In some cases, it may be possible to use secondary surface 106-2 with visible impurities or deformations, where the biometric sensor 102 is able to compensate the distortions in the biometric characteristic or in cases where the reduction in accuracy is not significantly large or is acceptable.

In an implementation, the primary surface 106-1 and the secondary surface 106-2 of the cabinet 104 may be kept in a way to allow maximum propagation of the electromagnetic rays across the surface, i.e., most of the electromagnetic rays are able to pass through the secondary surface 106-2 without getting reflected or getting absorbed by the plurality of surfaces 106. In one implementation, as shown in FIG. 1(a) instead of using secondary surface 106-2 completely made of material which is transparent to the electromagnetic rays, only a certain portion of the secondary surface 106-2 may be made from the material transparent to the electromagnetic rays. In another implementation, the secondary surface 106-2 may be made from combination of materials which are transparent to the electromagnetic rays, i.e. it may consist of clear glass with etching done at some appropriate locations or in an appropriate pattern.

In an embodiment, the biometric sensor 102 may be embedded in a wall or in a door where the secondary surface 106-2 may be sufficient to conceal the biometric sensor 102. For example, if the biometric sensor 102 is embedded in the wall or the door, structure of the wall or the door may cover the biometric sensor 102 from an outer side and the surface responsible for the emission of the electromagnetic rays may be considered as the secondary surface 106-2. In other words, in said embodiment, a walls or door of the enclosure 100 may have a doubled layered structure such that the layer towards the exterior side serves as the enclosure wall and the layer towards the interior of the enclosure 100 acts as the secondary surface 106-2. In such cases, surface of the wall or the door on which the holder 108 is placed to hold the biometric sensor 102 may be referred to as the primary surface 106-1. Although in the description only two embodiments of concealing the biometric sensor 102 have been disclosed, i.e., concealing the biometric sensor 102 in the enclosure 100 having the plurality of surfaces 106 and concealing the biometric sensor 102, by embedding the biometric sensor 102 in the wall or the door with the secondary surface 106-2 covering the surface responsible for the emission of the electromagnetic rays, it may be evident to a person having ordinary skill in the art that other embodiments of concealing the biometric sensor 102 are also possible.

Figure 1B:
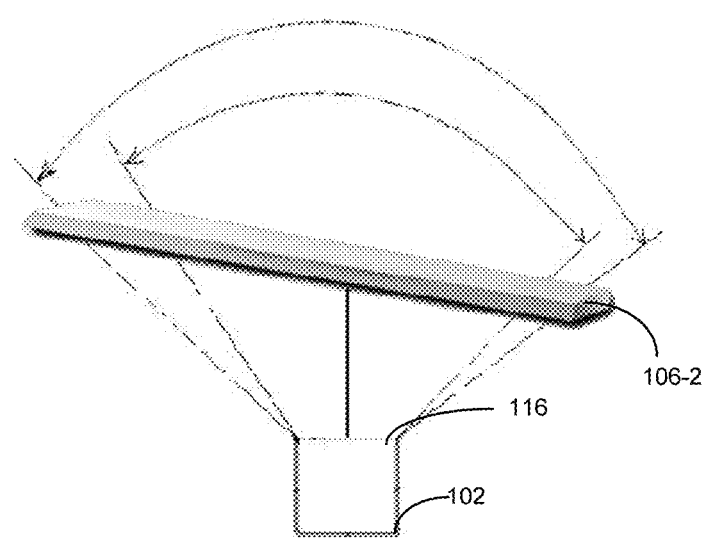
FIGS. 1(b) and 1(c) illustrate positioning of the biometric sensor and a secondary surface at a predefined angle between each other, in accordance with an embodiment of the present subject matter.
Figure 1C:
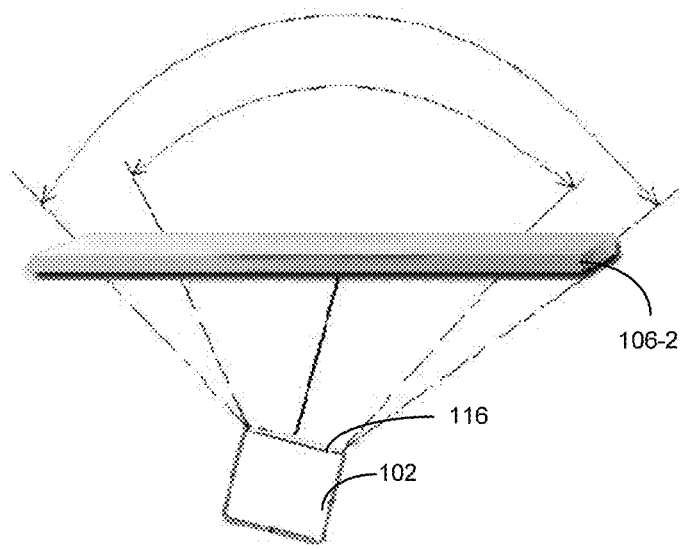
Figure 1D:
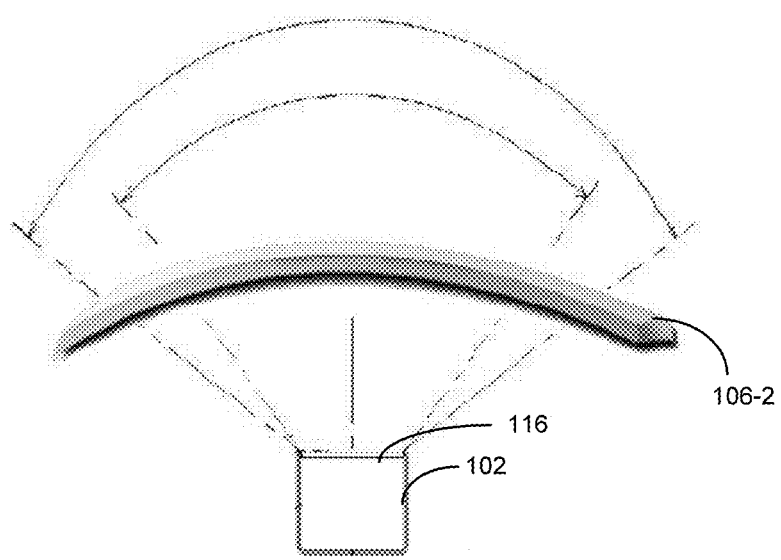
FIGS. 1(d) and 1(e) illustrate the secondary surface having a curved shape, in accordance with an embodiment of the present subject matter.
Figure 1E:
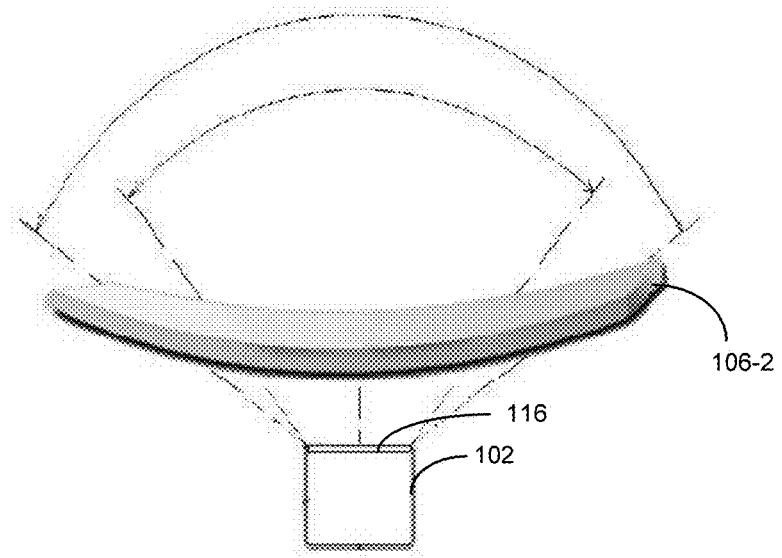
Figure 1F:
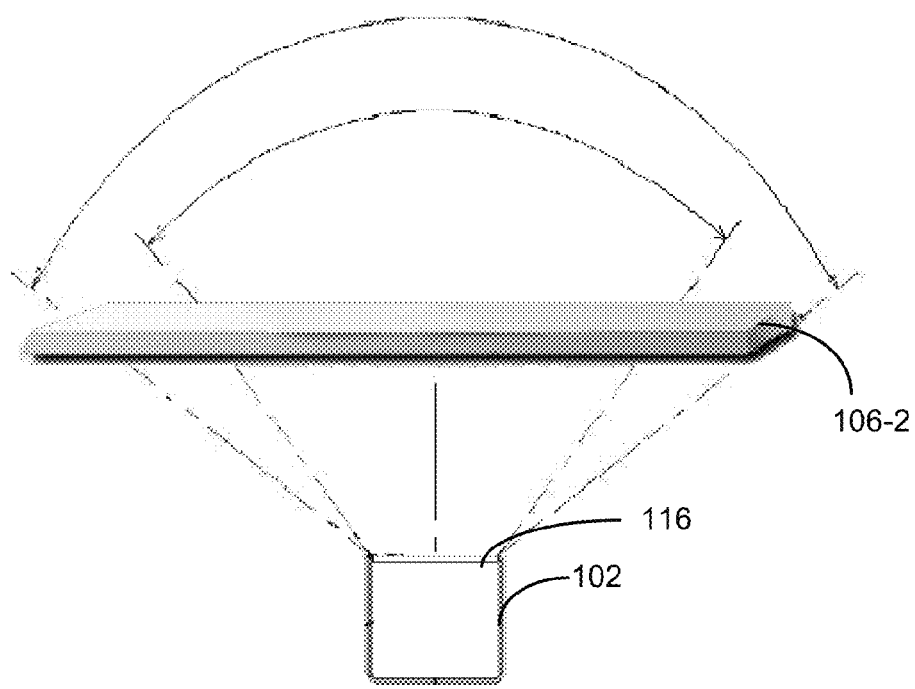
FIG. 1(f) illustrates a field of view of the biometric sensor, in accordance with an embodiment of the present subject matter.

In an embodiment, the secondary surface 106-2 and the surface of the biometric sensor 102 may be at an angle with respect to each other so that the reflection of the biometric sensor 102 and its emitters is not visible to the biometric sensor 102 or its camera. FIGS. 1(b) and 1(c) illustrate placement of a sensor of the biometric sensor 102, in accordance with an embodiment of the present subject matter.

In one implementation, as shown in FIG. 1(b), the secondary surface 106-2 may be kept at a predefined angle from a top surface 116 of the biometric sensor 102 such that the electromagnetic rays do not reflect, in high concentrations, back onto the biometric sensor 102 and reflection of the emitter may not be captured by the camera of the biometric sensor 102. The top surface 116 of the biometric sensor 102 may be defined as a surface from where the electromagnetic rays are emitted. As depicted in FIG. 1(*b*), in one implementation, the secondary surface 106-2 is tilted such that the secondary surface 106-2 and surface of the biometric sensor 102 are not parallel to each other and the secondary surface 106-2 is at an angle with respect to the secondary surface 106-2. To achieve this tilt, the enclosure 100 may be made such that the secondary surface 106-2 is affixed to the enclosure 100 at the top with a slight tilt.

In another implementation, as shown in FIG. 1(*c*), instead of tilting the secondary surface 106-2, the biometric sensor 102 may be placed in such a way that the top surface 116 of the biometric sensor 102 and the secondary surface 106-2 are at the predefined angle. As depicted in FIG. 1(*c*), to achieve the tilt the biometric sensor 102 may be titled while the secondary surface 106-2 is straight. For example, the holder 108 on which the biometric sensor 102 is placed may be provided with a slope to achieve the angle.

The angle may be any suitable angle between 0-90 degrees depending on various factors, such as the configuration of the biometric sensor 102 and the camera, the relative position of the biometric sensor 102 and the camera, and magnitude of illumination around the area of the biometric sensor 102. In one example, the predefined angle between the top surface 116 of the biometric sensor 102 and the secondary surface 106-2 may range from 3 degree to 35 degrees.

In both the implementations, as shown in FIGS. 1(*b*) and 1(*c*), the placement of the secondary surface 106-2 and the biometric sensor 102 helps in preventing a high concentration of the electromagnetic rays from reflecting back onto the camera of the biometric sensor 102. This may help in avoiding situation where an image of the emitter is captured by the camera of the biometric sensor 102.

In yet another implementation, the secondary surface 106-2 may have a curved shape so as to avoid the direct reflections of the emitter coming back to the sensor of the biometric sensor 102. For example the secondary surface 106-2 may have a dome shape with a depression either towards the biometric sensor 102 or away from the biometric sensor 102.

FIGS. 1(*d*) and 1(*e*) illustrate the secondary surface 106-2 having a curved shape, in accordance to an embodiment of the present subject matter. FIG. 1(*d*) depicts the secondary surface 106-2 having a convex shape. Similarly, the secondary surface 106-2 may have a concave shape, as shown in the FIG. 1(*e*). The curved shape of the secondary surface 106-2 may help in focusing the beam of the electromagnetic rays towards the camera of the biometric sensor 102. Similarly, other shapes of the secondary surface 106-2 may be also possible, such as combination of convex shape and concave shape, which help in accurately capturing the biometric characteristics of the user.

In the embodiments where the secondary surface 106-2 is at an angle with respect to the biometric sensor 102 or has a curved or a dome shape, the secondary surface 106-2 may also be made of a clear glass. The angle or the curved or the dome shape helps in addressing the problems associated with the reflection of the rays from the secondary surface 106-2.

In one implementation, the plurality of surfaces 106 other than the secondary 106-2 surface may be coated to avoid unwanted illuminations around the biometric sensor 102. For example, the plurality of surfaces 106 other than the secondary surface 106-2 may be coated with matte finish black colour paint to avoid the unwanted illuminations. The matte finish black colour paint absorbs the unwanted illumination around the biometric sensor 102. In one implementation, illumination around the biometric sensor 102 should not exceed 2000 luminous flux per unit area (Lux) for accurate authentication of the users.

For accurate authentication, the biometric characteristic of the user may be required to come in contact with the secondary surface 106-2 to allow the biometric sensor 102 to capture the biometric characteristic. For example, the user may place his palm on the secondary surface 106-2 to get his palm vein data read by the palm vein sensor accurately. If the user palm is not in contact with the secondary surface 106-2 of the cabinet 104, the biometric characteristic of the user may not be captured accurately which may affect the accuracy of the palm vein sensor adversely. However, as will be apparent to one skilled in the art, in case the secondary surface 106-2 is made of clear glass (flat at an angle or curved glass) the contact with the surface is not mandatory.

In one implementation, the secondary surface 106-2 includes guide marks for guiding the user while allowing biometric sensor 102 to read his biometric characteristic. For example, sign of a palm may be made on the secondary surface 106-2 to guide the user so that the palm of the user is properly placed on the secondary surface 106-2 such that the entire palm of the user is in field of view of the palm vein sensor. The field of view is discussed in more detail in reference to FIG. 1(*f*). The palm vein sensor may capture the impression of the entire palm of the user because the IR rays are reflected back by the entire palm of the user.

In one implementation, the secondary surface 106-2 is attached to a proximity sensor (not shown in figure) to activate the biometric sensor 102 when a biometric source, such as a palm, is detected near the secondary surface 106-2. The proximity sensor avoids a situation where the biometric sensor 102 emits electromagnetic rays to capture the biometric characteristic, but due to absence of the biometric source, the electromagnetic rays are not reflected back to the biometric sensor 102 and an error signal is generated. Thus, the proximity sensor ensures that the biometric sensor 102 is activated and emits electromagnetic rays when the palm is detected by the proximity sensor on the secondary surface 106-2. This helps in eliminating unnecessary actuation of the biometric sensor 102 and generation of the error signal. In another implementation, a touch switch or similar devices may be used to detect the presence of the biometric source.

In one implementation, the cabinet 104 further includes a door 110 with a locking mechanism 112. With the help of door 110 one can easily remove and place the biometric sensor 102. The locking mechanism 112 will ensure the security of the biometric sensor 102. The cabinet 104 also has an outlet 114 to allow passage of wires that communicatively couple the biometric sensor 102 to the authentication system.

FIG. 1(*f*) illustrates the field of view of the biometric sensor 102, in accordance with an embodiment of the present subject matter. The field of view may be defined as an area from where the impression of a palm or a finger is accurately captured. In one embodiment, the field of view may lie at a predefined distance of about 4 centimeters (cm) to 6 cm for the biometric sensor 102 having a viewing angle of about 83 degree to 115 degree. Accordingly the secondary surface 106-2 is placed in the field of view of the biometric sensor 102 at the predefined distance. This allows the biometric sensor 102 to capture the biometric characteristic of the user accurately.

Figure 2:
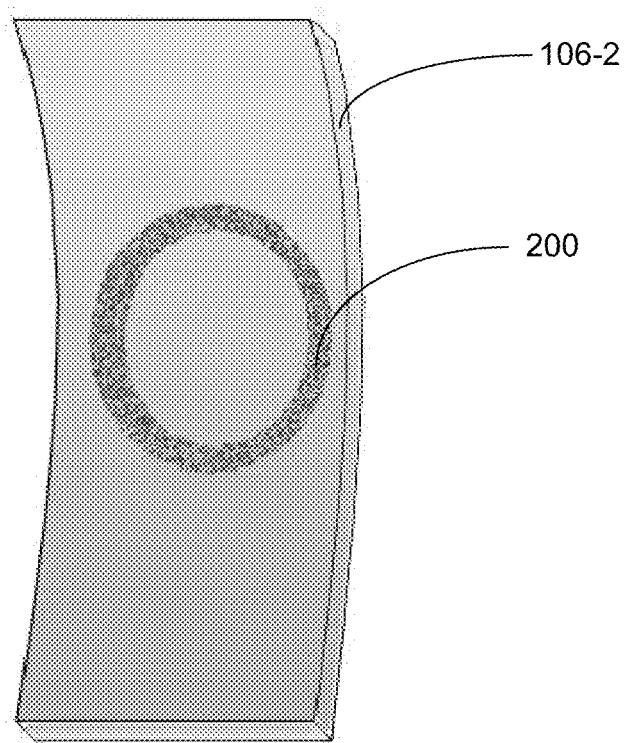
FIG. 2 illustrates the secondary surface etched in a unique pattern, in accordance with an embodiment of the present subject matter.

FIG. 2 illustrate the secondary surface 106-2 etched in a unique pattern 200, in accordance to with an embodiment of the present subject matter. As shown in FIG. 2, the secondary surface 106-2 is etched in the unique pattern 200 such that etched surface of the secondary surface 106-2 faces the biometric sensor 102. The etching removes glossy finish from the secondary surface 106-2 to avoid mirror-like reflection of the electromagnetic rays. Similarly, the secondary surface 106-2 may be cut or shaped in a specific pattern and then placed under a transparent surface which is clear and free from any type of impurity. The specific pattern design is generally inspired from placement of the emitter within the biometric sensor 102 or from pattern of emitter reflections seen in the image taken by the biometric sensor 102. For example, the secondary surface 106-2 may be a tracing paper or a similar material which may be cut or shaped in the specific pattern and then placed under a clear and transparent surface.

Further, operation of a palm vein sensor is explained, when the palm vein sensor is placed in the enclosure 100. Although the description herein is explained in reference to the palm vein sensor, it will be evident to a person having ordinary skill in the art that the enclosure 100 may be used for other types of biometric sensors as well.

When the user places his palm on the secondary surface 106-2 of the cabinet 104 for authentication, the proximity sensor coupled to the secondary surface 106-2 detects the presence of the palm on the secondary surface 106-2. In one embodiment, the palm of the user should be in complete contact with the secondary surface 106-2 for obtaining the impression of the palm accurately, while in another embodiment, the palm may also be placed above the secondary surface 106-2. Once the proximity sensor detects the presence of the palm on or in the vicinity of the secondary surface 106-2, the biometric sensor 102, such as the palm vein sensor placed on the primary surface 106-1 is activated. After activation, the biometric sensor 102 emits electromagnetic rays to obtain palm vein data of the user. The electromagnetic rays travel through the secondary surface 106-2 and are reflected back to the palm vein sensor from user's palm. A camera of the palm vein sensor captures the electromagnetic rays indicative of the image of the palm veins. The impression may be further sent to a system for authentication. The system may be defined as a host system connected to the palm vein sensor, which has pre-stored palm vein data of users. The system may compare palm vein data to the pre-stored palm vein data of the user for authentication. Then the system may decide whether the user is an authentic user to perform any required action or not based on the comparison of the palm vein data.

Further, in accordance with one embodiment of the present subject matter, a false acceptation rate and a false rejection rate of a biometric sensor 102 enclosed in the enclosure 100 are substantially same as that of a similar biometric sensor 102 without the enclosure 100. Thus, it may be understood that while the enclosure 100 serves to protect the biometric sensor 102 from external and environmental factors, it does not alter the characteristics of the biometric sensor 102. In one implementation, the false acceptation rate and false rejection rate of the palm vein sensor when placed in the enclosure 100 are almost equal to the false acceptance rate of 0.00008% and false rejection rate of 0.01% of the palm vein sensor without the enclosure 100.

Further, the secondary surface 106-2 is configured to ensure that the operation of the biometric sensor 102 is not hampered in any way by reflections from the secondary surface 106-2. Therefore, the enclosure 100 does not affect the accuracy of the biometric sensor 102 and at the same time secures the biometric sensor 102 by preventing it from theft, liquid spills, tampering, and wear and tear.

In one implementation, a tertiary surface may be overlaid or coated on the secondary surface 106-2. The tertiary surface may help in improving the tactile feel for the user as well as improve the overall touch coverage of the biometric characteristic of the user. The tertiary surface may be made from a pliable material to improve the overall tactile feel, touch coverage, strength, scratch resistance, reflectance, fingerprint or grease mark resistance, and disinfection of the secondary surface 106-2. In an example, the tertiary surface may be made of a polymer, substantially transparent to the electromagnetic rays. For the secondary surface 106-2, such as a glass, it is possible that the biometric capture quality may depend on various factors. For example, there should be no air gap between the tertiary surface and the secondary surface 106-2 and coverage of the touch area of the biometric characteristic with the tertiary surface.

Although the figures and description herein is provided for a specific design of the enclosure, albeit with a few variations, as will be understood by a person skilled in the art. In one embodiment of the present subject matter, other designs of the enclosure are also possible without deviating from the scope of the invention.

Other advantages of the enclosure for the biometric sensor 102 will become better understood from the description and claim of an exemplary embodiment of the enclosure for the biometric sensor 102. The enclosure for the biometric sensor 102 of the present subject matter is not restricted to the embodiments that are mentioned above in the description.

Although the subject matter has been described with reference to the specific embodiments, this description is not meant to be construed in limiting sense. Various modifications of the disclosed embodiments, as well as alternate embodiments of the subject matter, will become apparent to person skilled in the art upon reference to the description of the subject matter. It is therefore contemplated that such modifications can be made without departing from the spirit or the scope of the present subject matter as defined.

We claim:

1. An enclosure for securing a biometric sensor, the enclosure comprising a cabinet having a plurality of surfaces, wherein the biometric sensor is placed inside the cabinet on a holder fixed on a first surface from amongst the plurality of the surfaces of the cabinet, wherein the holder comprises a placement area for the biometric sensor, wherein a second surface of the cabinet is opposite to the first surface, the second surface is composed of a material transparent to electromagnetic rays emitted by the biometric sensor and coupled to a proximity sensor of the cabinet and configured to activate the biometric sensor upon detection of biometric characteristics, and wherein the biometric sensor emits the electromagnetic rays from a third surface, and wherein the third surface is the top surface of the biometric sensor located at the opposite of the holder.

2. The enclosure as claimed in claim 1, wherein the second surface is at a predefined angle from the third surface, and wherein the predefined angle ranges from 3 degree to 35 degree.

3. The enclosure as claimed in claim 1, wherein the biometric sensor is one of a palm sensor, a finger print sensor, an iris sensor, a footprint sensor, a hand/feet geometry sensor, an ear lobe geometry sensor, and a face biometric sensor.

4. The enclosure as claimed in claim 3, wherein the palm sensor is a palm vein sensor.

5. The enclosure as claimed in claim 1, wherein the cabinet comprises a door with a locking mechanism to place and remove the biometric sensor in the cabinet.

6. The enclosure as claimed in claim 1, wherein each of the plurality of surfaces of the cabinet, other than the second surface are coated to absorb unwanted illuminations around the biometric sensor.

7. The enclosure as claimed in claim 1, wherein material comprising at least one of a clear glass, a clear hardened glass, a etched glass, a etched hardened glass, a partially etched glass, a partially etched hardened glass, a patterned etched glass, a butter paper, a translucent plastic sheet and an acrylic sheet.

8. The enclosure as claimed in claim 1, wherein the second surface is placed in a field of view of the biometric sensor at a predefined distance such that the second surface is within focus of the biometric sensor.

9. The enclosure as claimed in claim 1, wherein the second surface is placed below a hardened glass sheet such that the hardened glass sheet provides support to the second surface thereby protecting the biometric sensor.

10. The enclosure as claimed in claim 1, wherein the second surface includes guide marks to guide a user.

11. The enclosure as claimed in claim 1, wherein a layer substantially transparent to the electromagnetic rays is overlaid on the second surface.

12. A system comprising:
an enclosure comprising a cabinet
the cabinet includes a biometric sensor comprising an electromagnetic ray transmitter for transmitting electromagnetic ray and a camera to capture reflected electromagnetic ray from the biometric source;
a first surface of the cabinet and wherein a holder is fixed on the first surface configured to hold the biometric sensor, wherein the holder comprises a placement area for the biometric sensor;
a second surface of the cabinet located opposite to the first surface, and is the second surface is composed of a material transparent to electromagnetic rays emitted by the biometric sensor a third surface is a surface from where the biometric sensor emits the electromagnetic rays, and wherein the third surface is the top surface of the biometric sensor located opposite to the holder and;
a proximity sensor coupled to the second surface of the cabinet, wherein the proximity sensor is configured to activate the biometric sensor upon detection of a biometric characteristics.

13. The system as claimed in claim 12, wherein the enclosure comprises an opening for connecting wires to the biometric sensor.

* * * * *